Figure 1:
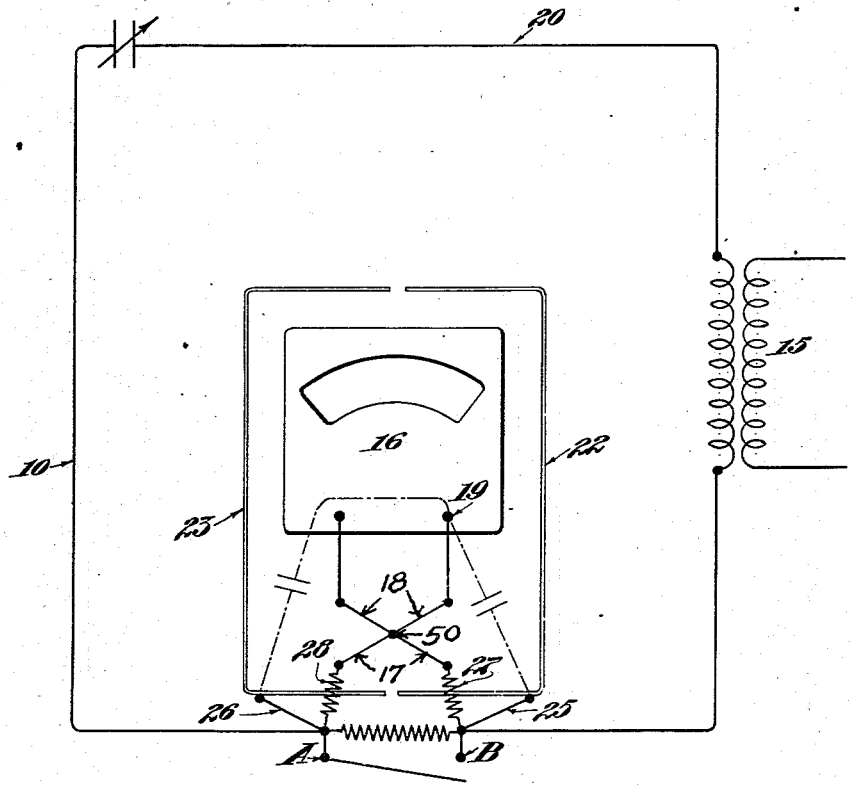

L. T. WILSON.
ELECTRICAL MEASURING INSTRUMENT.
APPLICATION FILED APR. 19, 1920.

1,396,350.

Patented Nov. 8, 1921.
2 SHEETS—SHEET 1.

Witness
M. L. Crozier

Inventor
Leon T. Wilson
by his attorneys
Van Curen Fish & Debell

L. T. WILSON.
ELECTRICAL MEASURING INSTRUMENT.
APPLICATION FILED APR. 19, 1920.
1,396,350.
Patented Nov. 8, 1921.
2 SHEETS—SHEET 2.
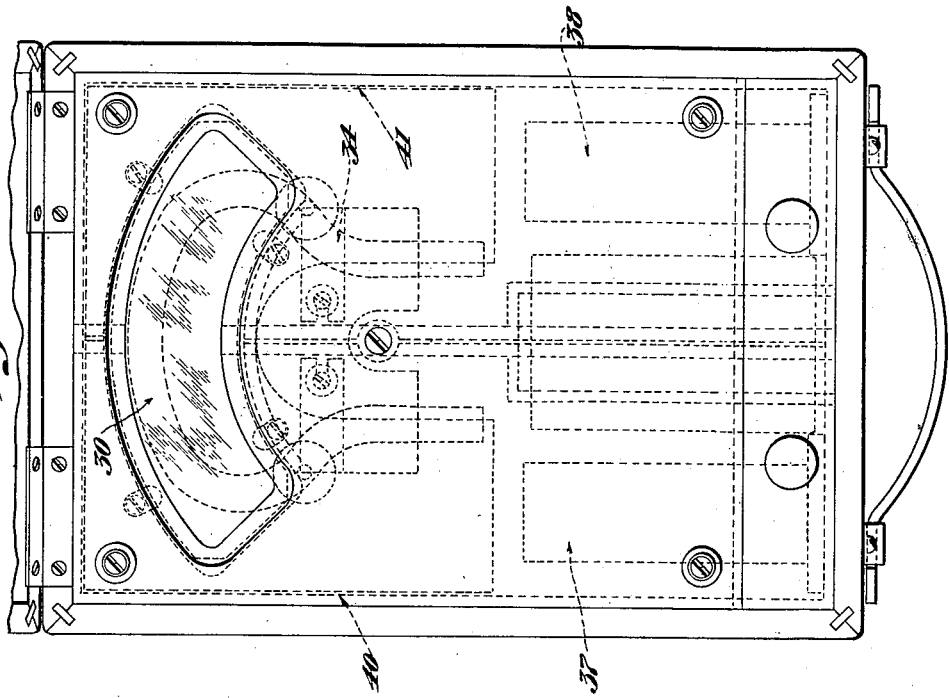
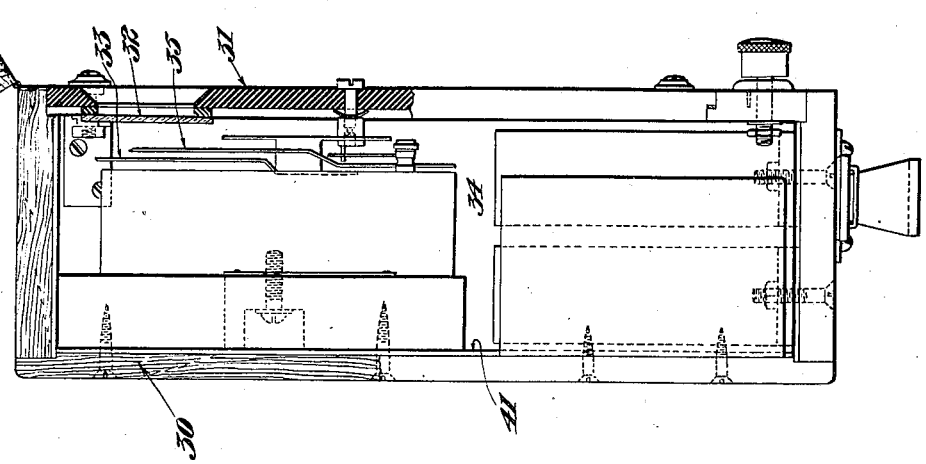

UNITED STATES PATENT OFFICE.

LEON T. WILSON, OF WEST SOMERVILLE, MASSACHUSETTS.

ELECTRICAL MEASURING INSTRUMENT.

1,396,350.    Specification of Letters Patent.    Patented Nov. 8, 1921.

Application filed April 19, 1920. Serial No. 374,926.

*To all whom it may concern:*

Be it known that I, LEON T. WILSON, a citizen of the United States, residing at West Somerville, in the county of Middlesex and State of Massachusetts, have invented certain new and useful Improvements in Electrical Measuring Instruments; and I do hereby declare the following to be a full, clear, and exact description of the invention, such as will enable others skilled in the art to which it appertains to make and use the same.

The present invention relates to measuring instruments adapted to be employed in connection with alternating current circuits of high frequency and more particularly to instruments for measuring the voltage impressed upon the circuit.

Measuring instruments have heretofore been employed for use in connection with such circuits and have served fairly well for measuring frequencies up to one or two thousand cycles per second and ammeters have been developed which will satisfactorily measure the current flow at substantially higher frequencies. No practical voltmeter has been developed, however, for use in circuits employing frequencies of five to ten thousand cycles per second or higher, all of the existing types of voltmeter being inherently defective for this purpose. Generally speaking, the voltmeters may be divided into two general classes, those in which the impedance varies according to the frequencies making them inaccurate for the measurement of high frequency circuits in which the frequency may vary within wide limits, and those instruments which are unaffected by changes in frequency but which are impractical due to their lack of sensitiveness.

It has been found that thermo-electric voltmeters, comprising a galvanometer together with a thermo-couple and connected heater wire, are sufficiently sensitive for the measurement of high frequency circuits but in their present form are not sufficiently accurate to render them capable of being used practically. This class of instruments when incorporated in a high frequency circuit will often show a reading when the two points across which the potential drop is to be measured are short circuited. It is believed that this is due to the capacity existing between the metal portions of the instrument and the opposite side of the high frequency line, causing the flow of stray displacement currents through the galvanometer.

The object of the present invention is to provide an improved measuring instrument of the thermo-electric type which is sufficiently sensitive for practical purposes and which may be calibrated either on direct current or low frequency alternating current without the necessity of correction when used for measurement purposes in high frequency work.

Accordingly, one feature of the invention consists in the combination with a measuring instrument of the thermo-electric type including a galvanometer, thermo-couple and heater wire, of capacity shunted about each half of the thermo-couple to afford a path for the flow of displacement currents and provide a balanced A. C. bridge in conjunction with the halves of the thermo-couple.

It is preferred to connect a non-inductive resistance in series with the heater wire to increase the range of the instrument and in order to provide a balanced arrangement of circuits, including the multiplier resistance and thermo-couple, and prevent a variation in the reading of the galvanometer depending upon the manner in which the terminals are connected, a further feature of the invention contemplates the employment of capacity in shunt with each half of the thermo-couple and a multiplier resistance.

In the simplest and best form of the invention now known this capacity is provided through the use of a two part metal shielding device which completely envelops the metal portions of the galvanometer, each half being shunted about one-half of the thermo-couple and a connected multiplier resistance to provide a path for the flow of displacement currents.

The two shields are exact counterparts of one another and each envelops one-half of the instrument, but it should be understood that if so desired the shields may vary relative to one another, and providing that the multiplier resistances are properly proportioned with relation to the two shields, the effect of a balanced bridge with the accompanying freedom from inaccuracies in calibration may be retained.

Figure 2:
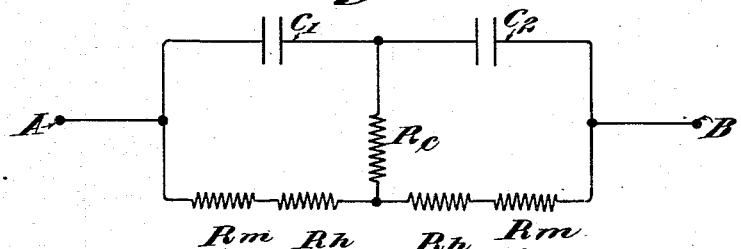
Figure 3:
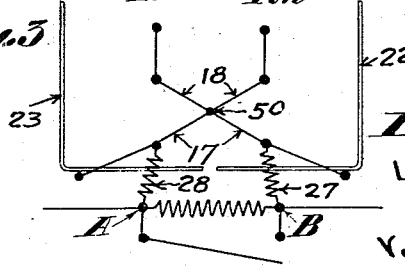

In the accompanying drawings Figure 1 is a diagrammatic representation of the new form of measuring instrument connected in a high frequency alternating current circuit; Fig. 2 is a diagrammatic representation of the balanced bridge effect, produced by dividing the shield and multiplier resistances into two parts; Fig. 3 is a diagrammatic view of a portion of a modified form of circuit illustrating an alternative method of connecting the multiplier resistances; Fig. 4 is a side elevation partly in section of a voltmeter as actually constructed embodying the features of the invention; and Fig. 5 is a front view of the voltmeter shown in Fig. 4.

Referring to Fig. 1, a high frequency circuit 10 is shown as provided with suitable inductance and capacity and a resistance A, B, across which the potential drop is to be measured. This circuit may be energized in the usual manner by inductively coupling it with a high frequency oscillator, indicated at 15. The galvanometer indicated at 16, is designed to measure the potential drop across A, B, and is provided with a thermo-couple of the crossed wire type in which 17 represents the heater wire and 18 the thermo-couple in which an E. M. F. is produced, the heater wire and thermo-couple being electrically and thermally connected at point 50. The terminal 19 of the galvanometer is the grounded terminal to which the metal case, permanent magnet and other metallic parts of the galvanometer are connected and if no shielding devices are provided it has been found that, due to capacity existing between the galvanometer and the high frequency circuit, a path is afforded for the flow of displacement currents between the terminal 19 and the line 20 of the high frequency circuit, causing the meter to read when A and B were short circuited and at the same potential. By providing shielding devices as herein described, a path is formed for the flow of any stray displacement currents substantially as indicated in dot and dash lines in Fig. 1. In this manner the galvanometer is freed from the influence of such currents.

In the illustrated embodiment of the invention the galvanometer and thermo-couple is surrounded by a pair of shields 22 and 23, each made of copper foil. The two halves of the shield are respectively connected to the points A and B through connections indicated at 25 and 26. The opposite ends of the heater wire 17 are also connected to the points A and B of the high frequency circuit through multiplier resistances indicated at 27 and 28 which are designed in conjunction with the two halves of the shield to form a balanced A. C. bridge. With this arrangement of shielding devices in conjunction with the multiplier resistances, it is found that the reading of the galvanometer is independent of the connection of the voltmeter leads to the points A and B, which may be readily explained by referring to the circuit diagram in Fig. 2. In this figure, $Rm$ indicates the multiplier resistance, $Rh$ and $Rc$ indicate respectively the heater wire and thermo-couple resistances and $C^1$ and $C^2$ indicates the capacity existing between each half of the shield and the galvanometer. Referring to Figs. 1 and 3 of the drawings, it will be evident that $Rm$ indicates the resistance of the multipliers 27 and 28, $Rh$ indicates the resistance of the heater wire 17 upon opposite sides of the junction point 50 and $Rc$ indicates the resistances of the two halves of the thermo couple 18. Upon referring to the diagram it will be obvious that in the illustrated embodiment of the invention if $C^1$ equals $C^2$ and the resistances are balanced, a balanced bridge results. It will also be obvious that in order to obtain the effect of the balanced bridge it is not necessary that $C^1$ equal $C^2$ so long as the resistances are properly proportioned with relation to the two parts of the shield.

Upon referring to Figs. 4 and 5, the manner in which the shielding devices may actually be included in a measuring instrument is clearly evident. As shown, the instrument is provided with the usual wooden case 30 having a front face 31 of insulating material provided with a sight opening 32 through which the calibrated dial 33 is visible. The instrument is provided with the usual permanent magnet, indicated at 34, and indicating hand 35, shown in Fig. 4. The multiplier resistances are mounted in the base of the instrument, as indicated at 37 and 38, respectively. Supported within the wooden case and completely inclosing the metallic portions of the galvanometer, together with the multiplier resistances and thermo-couple, is a device comprising the two parts 40 and 41. As will be evident from an inspection of Fig. 5, the two parts of the shielding device 40 and 41 are divided longitudinally throughout the length of the instrument and are symmetrical with relation to one another. The shield may be conveniently made of copper foil which forms an inner skin or layer for the interior of the inclosing case, as shown.

Under certain conditions it may be desirable, especially when using the instrument for measuring circuits of extremely high frequency, as one million cycles for example, to eliminate so far as possible an error which may be due to capacity existing between the multiplier resistances and other parts of the circuit, the effect of this capacity being, in general, to decrease the impedance of the multiplier, which decrease of impedance increases with the frequency. This effect may be substantially counteracted by providing a modified form of circuit, as shown in Fig. 3, in which the two halves of the shield are connected directly to the terminals of the thermo-couple heater rather than the points A and B. Although this form of circuit does decrease slightly the effectiveness of the shielding it is apparently insufficient to affect the calibration of the instrument. By arranging the circuit in this manner the capacity existing between the two halves of the shield is placed in parallel with the thermo-couple heater thus probably shunting some current from the thermo-couple heater and creating a tendency for the instrument to read less than the actual value which tendency increases with the frequency. Thus it will be evident that this method of connection tends to neutralize the error due to a decreasing impedance which tends to cause the instrument to read higher as the frequency increases.

I claim—

1. A measuring instrument for high frequency circuits comprising a galvanometer, a thermo-couple and a two-part shielding device having each part connected respectively to opposite sides of the thermo-couple and designed to form with the opposite sides of the thermo-couple an electrically balanced bridge.

2. A measuring instrument for high frequency circuits comprising a galvanometer, a thermo-couple, resistances connected with opposite sides of the thermo-couple, and a shielding device connected with each side of the thermo-couple, the two shielding devices designed to form a balanced bridge in conjunction with the opposite sides of the thermo-couple and the resistances.

3. A measuring instrument for high frequency circuits comprising a galvanometer, a crossed wire thermo-couple, resistances connected with opposite sides of the thermo-couple, and a shielding device for one side of the galvanometer and thermo-couple connected with each resistance, the shielding devices and resistances being designed to form a balanced bridge in conjunction with the opposite sides of the thermo-couple.

4. A measuring instrument for high frequency circuits comprising a galvanometer, a crossed wire thermo-couple, and an electrically balanced shielding device having two parts connected respectively to opposite sides of the thermo-couple and designed to form a balanced bridge with the two sides of the thermo-couple.

5. A measuring instrument for high frequency circuits comprising a galvanometer, a thermo-couple, equal multiplier resistances connected with opposite sides of the thermo-couple, a pair of shielding devices, each protecting one side of the galvanometer and thermo-couple, the shielding devices and resistances forming a balanced bridge in conjunction with the opposite sides of the thermo-couple.

6. A measuring instrument for high frequency circuits comprising a galvanometer, a thermo-couple electrically connected therewith, connections between the thermo-couple and a high frequency circuit to be measured, and capacity in shunt with each half of the thermo-couple to provide a path for the flow of stray displacement currents.

7. A measuring instrument for high frequency circuits comprising a galvanometer, a thermo-couple including a heater wire and couple in which an E. M. F. is produced, a non-inductive resistance in shunt with the heater wire and capacity in shunt with each half of the couple and heater wire to afford a path for the flow of displacement currents.

LEON T. WILSON.